(12) United States Patent
Hand et al.

(10) Patent No.: US 7,171,623 B2
(45) Date of Patent: Jan. 30, 2007

(54) METHOD AND APPARATUS FOR EFFICIENTLY EXPOSING NODES OF A DISPLAY MAP WHILE MONITORING METRICS IN A COMPLEX HETEROGENEOUS SYSTEM

(75) Inventors: Leonard S. Hand, Trophy Club, TX (US); Jeffery R. Washburn, Roanoke, TX (US)

(73) Assignee: International Business Machines Corporation, Armonk, NY (US)

(*) Notice: Subject to any disclaimer, the term of this patent is extended or adjusted under 35 U.S.C. 154(b) by 480 days.

(21) Appl. No.: 09/865,394

(22) Filed: May 25, 2001

(65) Prior Publication Data

US 2002/0175956 A1 Nov. 28, 2002

(51) Int. Cl.
*G06F 3/00* (2006.01)
*G06F 15/173* (2006.01)

(52) U.S. Cl. .................. 715/734; 715/853; 709/224

(58) Field of Classification Search ............. 345/734, 345/771, 853, 854, 473, 736; 709/223, 224, 709/226; 707/100 T; 701/208, 209; 715/736, 715/734, 853
See application file for complete search history.

(56) References Cited

U.S. PATENT DOCUMENTS

| | | | | |
|---|---|---|---|---|
| 5,297,253 A | * | 3/1994 | Meisel | 345/854 |
| 5,448,485 A | * | 9/1995 | Ishibashi et al. | 701/200 |
| 5,483,631 A | * | 1/1996 | Nagai et al. | 345/736 |
| 5,764,913 A | * | 6/1998 | Jancke et al. | 709/224 |
| 5,835,085 A | * | 11/1998 | Eick et al. | 345/853 |
| 5,929,855 A | * | 7/1999 | Benton et al. | 345/736 |
| 6,046,742 A | * | 4/2000 | Chari | 345/734 |
| 6,144,379 A | * | 11/2000 | Bertram et al. | 345/835 |
| 6,556,220 B1 | * | 4/2003 | Hammond | 345/764 |
| 2002/0165934 A1 | * | 11/2002 | Conrad et al. | 709/217 |

* cited by examiner

*Primary Examiner*—Kieu D. Vu
*Assistant Examiner*—Ting Zhou
(74) *Attorney, Agent, or Firm*—Akerman Senterfitt (57) ABSTRACT

A node exposing method including the step of a software agent obtaining from a display map, a reference to a node which is displayable in the display map. The software agent can be a platform independent software object. The node can represent a component in a complex heterogeneous system. The software agent can receive a data metric from the component. The software agent can then convert the data metric into an updated value. Once converted, the software agent can provide the updated value to the display map. The display map can responsively update the node to reflect the updated value.

16 Claims, 5 Drawing Sheets

METHOD AND APPARATUS FOR EFFICIENTLY EXPOSING NODES OF A DISPLAY MAP WHILE MONITORING METRICS IN A COMPLEX HETEROGENEOUS SYSTEM

BACKGROUND OF THE INVENTION

1. Technical Field

The present invention relates to the field of data monitoring and presentation, and more particularly, to a method and apparatus for efficiently exposing nodes on a map while monitoring entities or components within a complex heterogeneous system.

2. Description of the Related Art

Monitoring system performance can provide engineers and system operators with time critical information that can often help to alleviate or avert catastrophe and also design better systems. This is especially true for complex heterogeneous systems. Complex heterogenous systems are systems that can have entities and components that are diverse in their functionality and operability. In these complex heterogenous systems, it can often be necessary to monitor metrics defined for these systems in order to ensure that the components or entities in the system are functioning optimally. A metric is a standard of measurement that can be used for mathematical or statistical analysis. Metrics can include performance data or configuration information that can be used to setup software or hardware parameters. As the size of complex heterogeneous systems increase, so does the complexity of monitoring various metrics. Moreover, as complex heterogeneous systems become more diverse, it can become progressively more difficult to collect and analyze the various metrics collected.

For example, in complex heterogeneous systems, it can be necessary to monitor realtime performance to ensure that the network functions optimally. A content delivery network (CDN) is an example of a complex heterogeneous system and can include e-Business systems and communication networks. Since the CDN can consist of entities and diverse components, the size and heterogeneous characteristics of these CDNs can make it extremely difficult to perform real time analysis. Entities and components can include, but are not limited to servers, switches, routers, caches, load dispatchers (LD) and traffic managers. As a result, it is often required to perform tests on a scalable version of the network. Even then, personnel and expertise are required to dutifully monitor each component, entity or subsystem of the network, along with any associated applications databases and platforms. This post analysis monitoring can be extremely time consuming and very expensive.

Even in cases when performance metrics or attributes are collected, the collected data must be analyzed and presented in a manner that facilitates easy interpretation. Monitoring realtime performance requires simultaneous assessment of the performance metrics for all of the components or entities forming the CDN. Realtime values of the performance associated attributes must be available in order to determine what attributes are causing a bottleneck and what components, entities or subsystems might have resources available to accommodate additional traffic.

Importantly, collection and visualization of system information such as performance metrics and configuration data, requires communication between the agents collecting the information from the entities or components within the system and a graphical display used to display a map of the collected information. In current systems, specific communication protocols are required for communicating information between the agents, components or entities and the display map. The nodes of the display map corresponding to the entities or components in the system must communicate using the same protocol as the agents collecting the information. Given the fact that the nodes must communicate with the agents using the same protocol, the nodes in the display map must have intimate knowledge of the agents in the system. As a result of these constraints, the proximity and type of graphical display that can be used for monitoring and visualizing the metrics or attributes can be limited.

Given these inherent drawbacks associated with realtime monitoring and visualization of metrics or attributes associated with heterogeneous systems, there exists a need to provide a more efficient approach to dynamically visualizing updated metrics in these kinds of systems.

SUMMARY OF THE INVENTION

The invention discloses a method and system for node exposing. The node exposing method can include obtaining from a display map, a reference to a node which can be displayable in the display map, wherein the node represents a component or entity in a complex heterogeneous system. An updated value can be provided to the display map for each component or entity. The updated value can be used for computing an indicator for representing the node on the display and the displayed node updated to reflect updated values. The method can further include displaying the computed indication for the node on the display map.

In another aspect of the invention, the node exposing method can include providing by request to requesting agents, references to nodes that are displayable. Each displayable node can represent a component in a content delivery network (CDN). The displayable nodes can be represented in a display map and the nodes can be updated based on values received from requesting agents. The agents can have the capability of requesting and reporting updated node values.

A node exposing system is also disclosed. The node exposing system can include a display map for displaying nodes and representations of reported values for the nodes. A plurality of agents can acquire references to individual ones of the nodes, wherein the agents can obtain updated values for particular nodes. The agents can report the updated values to the display map.

Consistent with the method and system previously described, a machine readable storage having stored thereon, a computer program having a plurality of code sections for exposing a node is disclosed. The code sections can be executable by a machine for causing the machine to perform the steps of obtaining from a display map, a reference to a node which is displayable in the display map, wherein the node represents a component in a complex heterogeneous system. An updated value for the component can be provided to the display map, with the display map updating a display of the node. The updated display node reflects the updated value.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention discloses a method for dynamically exposing the nodes of a display map. A display map node can be a symbolic representation of a component or entity in a complex heterogeneous system that is to be monitored and visualized. Each symbolic representation can then be viewed on a graphical display such as a map display. To visualize the operation of the heterogeneous system, the graphical map display can be updated to reflect changes in the state of the entities or components represented by the nodes. In accordance with the invention, a method and system for exposing nodes can include reporting realtime performance metrics for components and entities within a complex heterogeneous system which can include a CDN. Performance metrics for each system component and entity of the complex heterogeneous system can be collected and displayed in realtime on a graphical map display.

The nodes of a display map can be exposed while monitoring and visualizing metrics or configuration information for complex heterogeneous systems. Complex heterogeneous systems are systems that contain numerous diverse components and entities and seamlessly interoperate to provide one or more functions. Complex heterogeneous systems can include unlimited combinations of CDN, computer networks, operating systems, databases, communication systems and the like. A metric can be defined as a standard of measurement that can be used for mathematical or statistical analysis.

Within a complex heterogeneous system, attributes of the metrics can be defined for the various components or entities within the system. An attribute is merely a type of metric used to identify a particular character of a system. The values associated with the defined attributes of the data metrics can be periodically collected from the entities within the system by using agents. These values associated with the defined attributes for the data metrics can be mapped to symbolic representations of the components in the system. The symbolic representation can be displayed in a display map along with nodes used to represent the system components.

An agent can be an application or part thereof that can be designed specifically to interface with, and collect and report information on a device that is being managed. Agents, also referred in the art as "bots" (robot), can be used to collect updated metric values. With existing systems, the identity of each agent must be known to the map display and hence, its corresponding nodes. As a result, a specific protocol is required for communication between the agents and the display map. The present invention eliminates the need for a display to know the agent and hence, the need for a mandated protocol to facilitate communication between an agent and a display map. This can be accomplished by the agent initiating a request to the display map to acquire the identity of the nodes in the display map. Once the identity of the nodes are known to the agents, the agents can interrogate the components or entities in the network, and can collect updated values for the state of the components or entities which can be used to update the display map.

Notably, the map display can have indicators which can represent the realtime values of the system performance metrics. The indicators can include, for example, icons. The performance data metrics which are displayed in the map can be selected from a list of data metrics. In this way, one viewing the map can easily recognize the realtime values for the metrics associated with particular components of the system being monitored.

Figure 1:
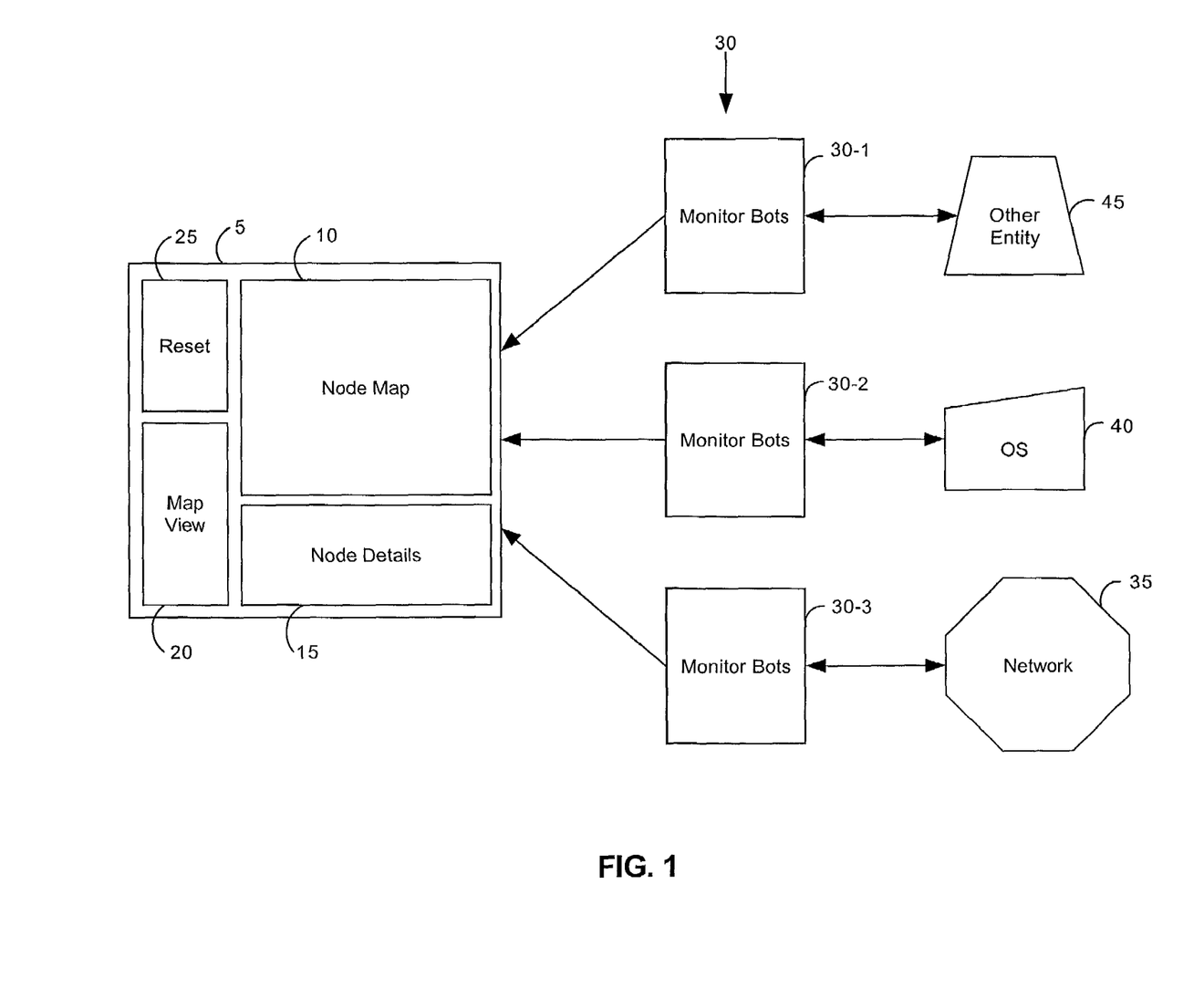
FIG. 1 is a block diagram of an architecture for a Data Metric Map.

FIG. 1 is a block diagram which illustrates an architecture of a data metrics map in accordance with the inventive arrangements. Two components of the architecture of FIG. 1, include the data metrics map display 5 and the supporting data metrics map components. The data metrics map display 5 can contain a node map display section 10, a node detail display section 15, a map view display section 20 and a reset display section 25. The data metrics map components can include a multitude of agents or monitor bots 30 (robots), such as bot 30-1, bot 30-2 and bot 30-3. Other components of the architecture can include ilie system to be monitored, which can be a network component 35, an operating system component 40 and a miscellaneous component 45, for example, a network, a database, an operating system and/or an application respectively.

The data metrics map display 5 can be a graphical display window in a CRT, LCD, Plasma or LED screen which can be coupled to a computing device such as a workstation, a PC, a laptop. The map display 5 can be a GUI, for example, a Java based browser configured to process HTML, XML, WML, or similarly formatted information. The data metrics map display 5 can be divided into a plurality of display window sections, each display section serving a specific function. The node map section 10, the node detail section 15, the map view section 20 and the reset section 25 all can be windows located within the map display 5.

The heterogeneous system to be monitored and for which data can be reported, can include a network 35 consisting of workstations and other network entities, for example, routers, databases, switches, bridges, and web application servers (WAS). The system for which metric values can be visualized also can include an operating system 40 and applications which can utilize the operating system. Exemplary computing platforms can include but is not limited to, PC, Miniframe and Mainframe computers. A network management protocol can facilitate communications between the various components and entities forming the network. Network management protocols are known in the art and are used to monitoring and maintaining networks. Finally, the complex heterogeneous system to be monitored and for which data can be visualized can include other components or entities 45, such as databases, an operating systems, load dispatchers, traffic managers and networks of communication devices.

In operation, the data metrics map display 5 can display a graphical representation of reported metrics from the components and entities within the system to be monitored. The map display 5 can dynamically change to reflect updated values for the reported metrics corresponding to the components and entities within the system being monitored. The graphical representation of the system components or entities can be displayed as icons or other suitable designators within the window of the node map section 10. In a further aspect of the invention, the graphical representation of the system components or entities displayed in node map section 10 can be connected by lines or placed in such a manner as to illustrate the relative communication relationships between the system being monitored and its components.

In operation, the node details display section 15 can display data metric values and other information pertaining to each component and entity in the heterogeneous system being monitored. The metrics collected for each of the components can be displayed, for example, in a chart, graph, or a table.

By comparison, the map view display section 20 can be used to control metrics to be reported, collected and displayed in the data metrics map display 5. The map view display section 20 can provide a list of the metrics to be selectively displayed. More particularly, only those metrics which are selected in the list are displayed in the node details display section 15. In addition, the corresponding icons in the map display section 10 can be updated to indicate the updated value of the selected metrics.

Finally, the reset display section 25 can contain a selectable list of all the system components and entities. The selectable list of all the system components and entities can be used to reset all or particulars ones of the metrics in the node details display section 15 and the node map section 10. The reset function allows the metrics to be initialized or set to a default value.

In one aspect of the present invention, a maximum and a minimum value can be defined for each metric to be monitored and displayed. Various levels of quantized values can be defined for values falling between the defined maximum and the defined minimum value. Each of the quantized values can be mapped or assigned to a unique indicator. Notably, the unique indicator can be a color, varying shades of gray, and a pattern, or any combination thereof. A pattern, for example, can include variations of cross-hatched patterns. The unique indicator can be used in conjunction with the icon that represents an entity to represent the value of the metric for a metric. The unique indicator can be represented in the map view display section 20 where it can be used as a legend to reference the values indicated by the icons displayed in the map display section 10.

During a reporting phase, the data metrics map display 5 can receive updates of values pertaining to a particular metric from agents or bots 30-1, 30-2, 30-3, that monitor the components or entities 35, 40, 45 within the heterogeneous system. The updates of values pertaining to each metric can be the result of an interrogation from the bots 30-1, 30-2, 30-3 and can be contained within particular fields of an update message. In response to the interrogation from the agent or bots 30-1, 30-2, 30-3, the value of the requested metric can be sent to the agent or bot 30-1, 30-2, 30-3. This value of the metric can be used to update the data metrics map display 5. For example, bot 30-3 can interrogate a component of network 35 for a specific metric. In response to the interrogation request, the component of network 35 can supply the value of the requested metric to bot 30-3. The data metrics map can then be updated with the value through the reporting procedure.

Figure 3:
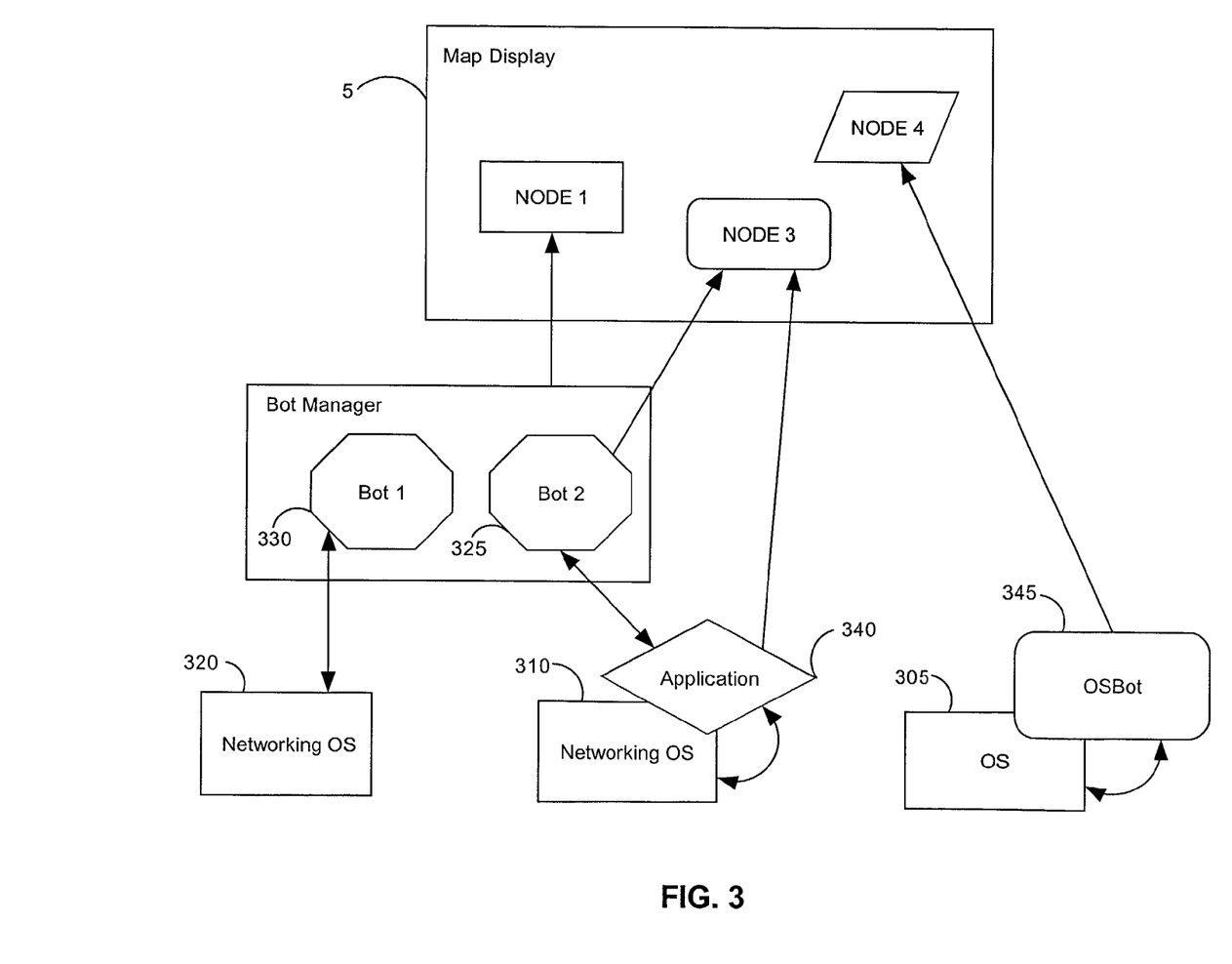
FIG. 3 is a diagram of the update process for the Data Metric Map view used to monitor a CDN as shown in FIG. 2.

In a further aspect of the invention, the bots 30-1, 30-2, 30-3 can be managed by a single bot manager (shown in FIG. 3). For example, bots 30-1, 30-2 and 30-3 can be managed as a single entity. Hence, the bot manager can handle interrogation of the component or entities of the system and also update the values of the data metrics map based on the response of the interrogation.

Figure 2:
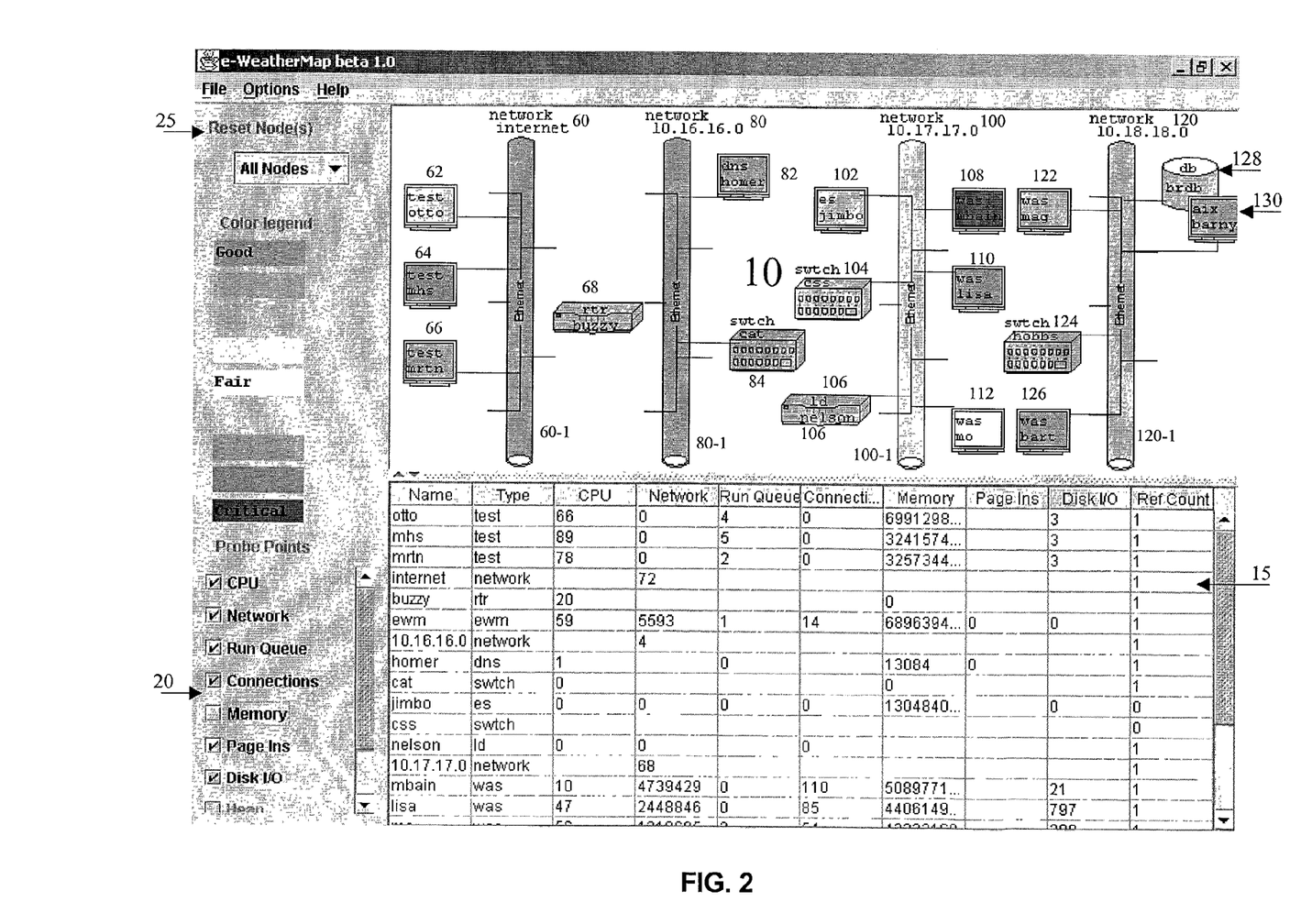
FIG. 2 is an detailed diagram of a Data Metric Map used to monitor a CDN.

There is shown in FIG. 2, a detailed diagram of a data metrics map display used to monitor a heterogeneous CDN which can include a communication network. The data metrics map of FIG. 2 can be used to dynamically monitor the network components or entities of four networks, 60, 80, 100, and 120. Network 60, the Internet, can include three components or entities, namely, a work station "otto" 62, a work station "mhs" 64, a work station "mrtn" 66. Network 80, having an IP address of 10.16.16.0, can have 3 components or entities. Namely, a domain name server (DNS) "homer" 82, a switch (swtch) "cat" 84, and a router component (rtr) "buzzy" 68. Network 100, having an IP address of 10.17.17.0, can include 6 components or entities. Namely, an edge server "jimbo" 102, a switch (swtch) "css" 104, a local director (ld) "nelson" 106, a web application server (WAS) "mbain" 108, a web application server (WAS) "lisa" 110, and a web application server (WAS) "mo" 112. Network 120, having an IP address of 10.18.18.0, can include 4 components or entities. Namely, a web application server (WAS) "mag" 122, a (swtch) "hobbs" 124, a web application server (WAS) "bart" 126, an AIX machine "barny" 130 and an database server "brdb" 128.

The graphical representation of the system components and entities to be displayed in the map display section 10 of the data metrics map can be icons. In one embodiment, a vertical cylindrical icon can be used to represent the backbone of the network. For example, the backbone of network 60 can be represented by a vertical cylindrical icon 60-1. The backbone of network 80 can be represented by a vertical cylindrical icon 80-1. The backbone of network 100 can be represented by a vertical cylindrical icon 100-1. The backbone of network 120 can be represented by a vertical cylindrical icon 120-1. An icon illustrating a monitor can used to represent workstations/servers within the communication system being monitored. For example, workstations 62, 64, 66, 82, 108, 110, 112, 122, 126, and 130 can be represented by a monitor icon. The workstation can be a PC, a laptop, a conventional diskless workstation or a conventional workstation having a disk. An icon of a router can be used to represent components or entities that are function as routers in the system. For example, router 68 and local director 106 have similar icons. An icon of a switch can be used to represent switches in the system. For example, switches 84, 104, and 124 can be represented by the switch icon. The domain name server 82, edge server 102, and the web application servers 108, 110, 112 and 122 can be represented with a similar icon as a workstation. A conventional database icon can be used to represent database 128.

The node map section 10 can show the inter-relation between the various system components. For example, the components of network 80 can be shown to be associated to network 80 by connecting the router 68 icon, the domain name server 82 icon and the switch 84 icon by lines to the central backbone 80-1 icon. It should readily be understood that the icons are arbitrarily assigned and are not intended to be a limitation on the system.

The node detail display section 15 can display the name of the components or entities to be monitored and the value for the metrics. Referring to FIG. 2, the node detail display section 15 can be arranged in a tabular form. The name of the components or entities to be monitored can be located in the first column of the table. For example, the first entry, row one column 1, can contain the header "Name." The second entry, row 1 column 2, can contain the header "Type," which lists the type of component or entity. The components or entities along with their type can be listed respectively as shown: "otto" with a type of test, "mhsm" with a type of test, "mrtn" with a type of test, "Internet" with a type of network, "buzzy" with a type of router (rtr), "ewm" with a type of "ewm", 10.16.16.0 with a type of network, "homer" with a type of domain name server (DNS), "cat" with a type of switch (swtch), "jimbo" with a type of es, "css" with a type of switch (swtch), "nelson" with a type of local director, 10.17.17.0 with a type of network, "mbain" with a type of web application server (was), and "lisa" with a type of web application server (was).

The name of the metrics to be monitored for the components or entities can be placed in the first row of the table in the node detail section 15, starting at the third column. The names can be used as headers for each column. For example, the metrics to be monitored for each component or entity of the system can include, CPU usage (CPU), Network Usage (Network), Run Queue, Connections, Memory, Page Ins, and Disk I/O respectively. The corresponding value of a metric for a specific component or entity can be located at the position where the metric column intersects the entity or component row.

The map view display section 20 can contain a list of probe points, for example, as shown under the heading Probe Points in FIG. 2. The probe points are the metrics that can be measured for the components or entities forming the system. Referring to FIG. 2, the list of probe points or metrics to be monitored can include: CPU usage (CPU), Network Usage (Network), Run Queue, Connections, Memory, Page Ins, and Disk I/O. In one aspect of the invention, the probe points or metrics are selectable. The selection of a probe point or metric can occur by placing a check mark next to the probe point or metric. The selection of the probe point or metric can determine what metrics gets displayed in the map display section 10 of the data metrics map. By having seven selectable probe points, there are 128 or $2^n$ possible views for metrics of the components or entities forming the system.

As the updates containing the metric values for monitored components and entities are received, the corresponding locations in the table of the node detail section 15 can be dynamically updated. The update process can occur in realtime or it can be delayed. The node map display section 10 can also be updated whenever updated values for the are received. Based on which probe points or metrics are selected in the map view display section 20, the appropriate icons representing the component or entity will be updated to reflect the updated value for the metric. As an illustrative example, the updated value for the CPU usage of WAS "mo" 112 is 7%. The attributes for the CPU usage can be defined as follows. The maximum CPU usage for the system can be 100% and the minimum can be 1%. The CPU usage can be quantized into discrete values and each discrete value represented by a different color as follows: 1–10%: RED, 11%–20%: ORANGE, 21%–30%: YELLOW, 31%–40%: BLUE, 41%–50%: INDIGO, 51%–60%: VIOLET, 61%–70%: TEAL, 71%–80%: LIGHT GREEN, and 80%–100%: DARK GREEN. The 80–100% range indicated in red can signify a critical state. The 41%–50% range represented in indigo, can represent a fair state. The 11%–20% range indicated in orange, can represent a good state. The 1%–10% range indicated in dark green, can represent an excellent state. Varying operating states can exists between these states. Since the updated value of the CPU usage for "mo" was 7%, then the icon for 112 would be represented in the color red indicating that a critical state exists for "mo." If further, the updated memory usage value for "mo" was 95%, leaving insufficient memory for the CPU to operate, then if memory was also selected in the map view display section 20, the value of 95% can fall into a critical range and the icon 112 for "mo" can be changed to reflect the new value in the node map display section 10. As a result, the icon for 112 requires a method for accurately indicating multiple metrics values when many different metrics are selected for display. In one aspect of the invention, the metrics can be prioritized for display. As a result of this priority scheme, only the metric with the highest priority gets selected for display on the map. Hence, if CPU was given a higher priority than the memory usage, then the icon displayed in the node map section 10 for 'mo' would be red indicating that the CPU usage was critical. However, both critical values would be displayed in the table of the node detail section 15 of the map. In a further aspect of the invention, critical values that are displayed in the table of the node map section 10 can be colored and or made to flash.

In a further aspect of the invention, whenever there are more than one critical states for an entity or component, the icon for that component or entity can be made to flash within the node map window 10 and/or the node detail window 15. During operation, a user will notice the flashing critical state and can then consult the node detail section 15 to determine the actual metrics that are causing the critical condition. Additionally, a user viewing the map display section 10 could uncheck the checked selection in the map view display section 20, and then selecting one at a time, those probe points or metrics that were previously checked. This would instantly show each of the metrics that where causing the critical states.

In accordance with the inventive arrangements, the agents or bots can be used to acquire values for the metrics and update the data metrics map accordingly. FIG. 3, is a block diagram illustrating three components of a network, namely, an operating system (OS) component 305, a networking OS component 310 and a networking OS component 320. The OS component 305 can contain an operating system bot 345 (OSBot) that can reside within an operating system component platform 305. The OSBot 345 can interrogate the component directly and update the data metrics map metrics values for the OS component 305.

In operation, bot 1 (330) can interrogate networking OS Component 320 in order to acquire values for specified data metrics through bot 1 (330). In response to this interrogation request, the networking OS component 320 can send the value for the requested data metrics to bot 1 (330). On receipt of the updated value for the data metric, the bot 1 (330) can update the appropriate node, node 1, of the data metrics map with the updated value for the data metrics through a reporting procedure.

The networking OS component 310 can contain an application, for example, application 340. Application 340 can be integrated within the networking OS component 310 or it can reside externally to the networking OS component 310. In one aspect of the invention, the application 340 can interrogate networking OS component 310. Upon interrogation of the network OS component 310, application 340 can update node 3 of the map display 5. Moreover, bot 2 (325) can independently interrogate the networking OS component 310 for updated values for specified data metrics. Upon receipt of these updated value, bot 2 (325) can also update node 3 of the display map 5. It should be readily understood that although a bot, such as bot 2 (325), can interrogate a component or entity, a bot can otherwise influence a component or entity, for example by accessing that component or entity. The bot can acquire any updated data metrics and accordingly update a node.

The OS component 305 can contain an OSBot 345. The OSBot 345 can be integrated within the OS component 305 or it can reside externally. In operation, OSBot 325 can interrogate the OS component 305 for updated values for specified data metrics. On receipt of the updated values, the OSBot 345 can directly update the appropriate node, node 4, of the map display.

Figure 4:
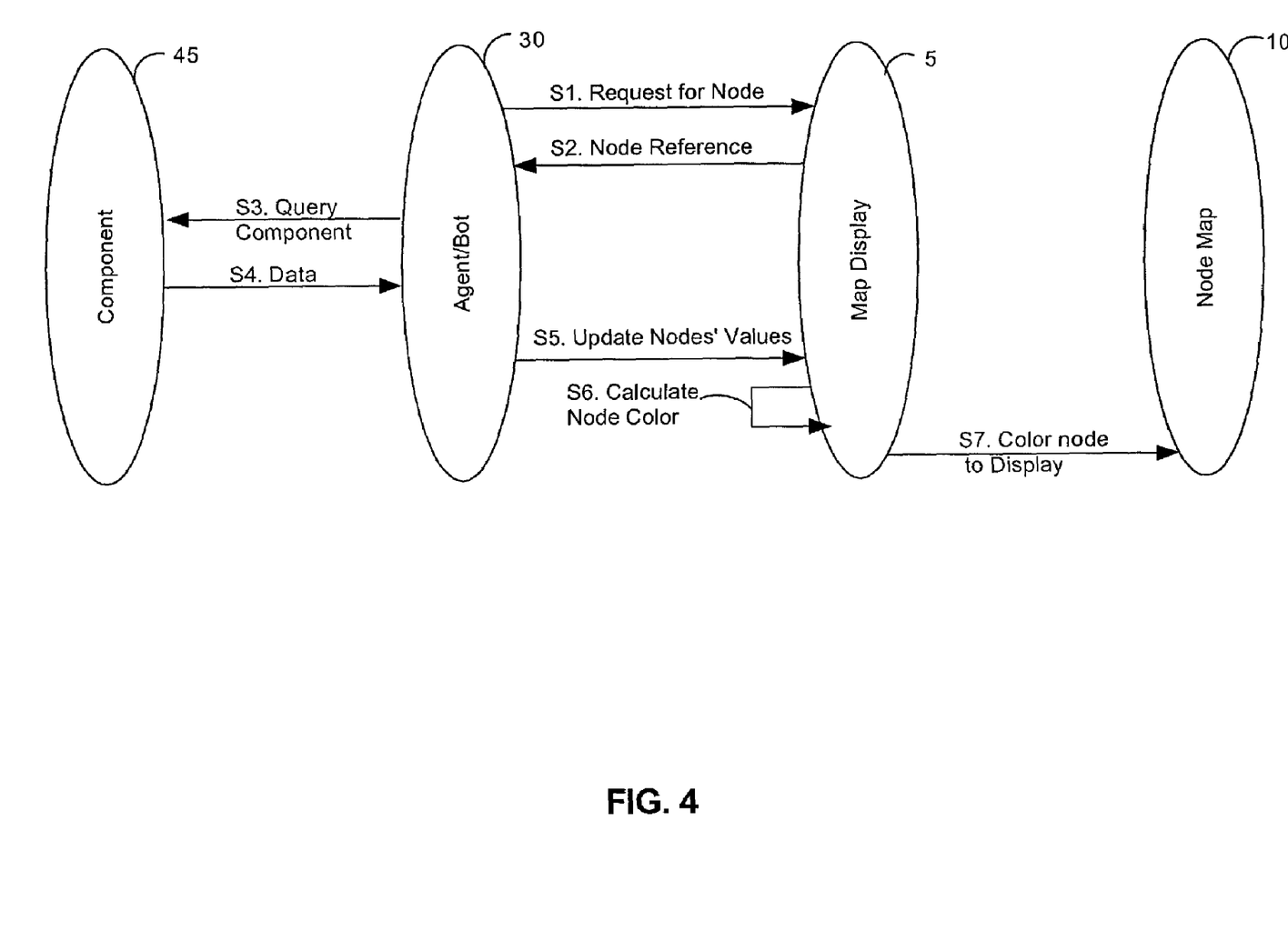
FIG. 4, a flow diagram illustrating interaction between components and entities of a monitored system of FIG. 1.

Turning now to the node exposing aspects of the invention and particularly, the ability of agents to update the nodes of a map display without using a mandated communication protocol, referring to FIG. 4, there is shown a flow diagram illustrating various interaction between components and entities of a monitored system as in FIG. 1. In step S1 the agent or bot 30 can request the reference (identity) for a node from the map display 5 by using a request message. In step S2, the display map 5 can send a reply message containing the node reference to the requesting agent or bot 30.

Once the identity of the node is acquired by the bot 30, the bot 30 can query the component 45 to acquire data, for example, performance data as shown in step S3. In response to the bot's 30 query for performance data, the component 45 can return the performance data in an update message sent to the bot 30 as shown in step S4. In step S5, the performance data which contains updated metric values can be sent from the requesting bot 30 to the map display 5. In step S6, the appropriate coloring for the node corresponding to the node reference can be computed by using the updated metric value. Finally, in step S7, the computed coloration for the node can be used to update the node in the node map 10. The computation of a coloration for indicating the value of the metric for the node is not intended to be a limitation on the invention. It should be recognized that the acquisition of performance data is not intended to be a limitation on the system. Accordingly, other types of data can be acquired.

Figure 5:
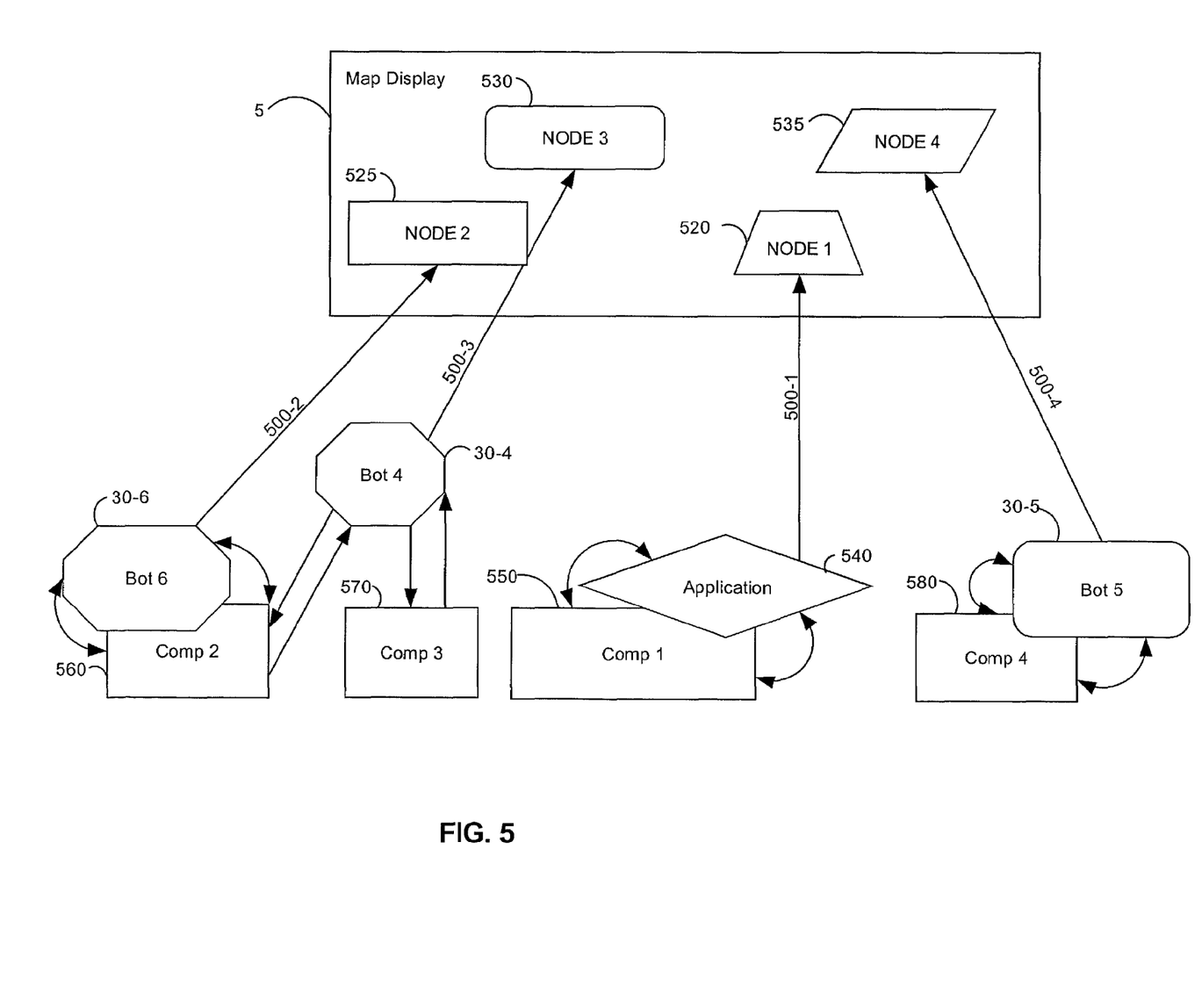
FIG. 5 is a diagram showing multiple node exposure.

FIG. 5 is a block diagram illustrating a node exposure procedure in accordance with the inventive arrangements. The procedure of exposing a node includes identifying or providing a reference of a node to an agent. Referring to FIG. 5, there is shown a map display 5, having 4 nodes, namely, node 1 (520), node 2, (525), node 3 (530) and node 4 (535). There are also 4 components, namely comp 1 (550), comp 2 (560), comp 3 (570) and comp 4 (580). The four nodes can be exposed to 3 bots, namely, bot 4 (30-4), bot 5 (30-5) and bot 6 (30-6). Additionally, the nodes can also be exposed to one or more agents which can be an application or part of an application, for example, a application 540. The bots and applets or applications can each request a reference to a particular node as shown in steps 500-1, 500-2, 500-3 and 500-4.

On receipt of a request, the map display 5 can send a reply message to a requesting bot, agent, applet or application. The reply message can identify one or more nodes in the display map. As a result of the node exposure procedure of FIG. 5, bot 4 (30-4) obtains a reference to node 2 (525) and node 3 (530) of the map display 5. Bot 4 (30-4) can monitor component 2 (560) and component 3 (570). Likewise, as a result of the node exposure procedure, bot 6 (30-6) obtains a reference to Node 2 (525), and bot 6 (30-6) can also monitor component 2. Similarly, applet 540 obtains a reference to node 1 (520) and applet 540 can monitor component 1 (550). Also, bot 5 (30-5) obtains a reference to node 4 (535), and bot 5 (30-5) can monitor component 4 (580).

The node exposure procedure described herein, allows any of the nodes in a map display 5 to be identified (exposed) to any agent or supported application. In consequence, the source of the request for a reference or identity to any node in the map display 5, is not necessary to the map display 5 and, hence, there is no need for the map display 5 to use a mandated protocol for communicating with the agents in the system. Advantageously, the node exposure procedure allows multiple instances of updates to take place on any of the nodes. For example, node 2 (525) can be updated by bot 6 (30-6) as well as bot 4 (30-4), both of which monitor component 2 (560). As a result, the system has the capability to centrally monitor the components in the system and to provide a consolidated view for monitoring the complex heterogeneous system.

The present invention can be realized in hardware, software, or a combination of hardware and software. A method and system for exposing nodes according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

While exemplary systems and methods embodying the present invention can be shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

The invention claimed is:

1. A node exposing method, comprising:

obtaining from a display map, references corresponding to a plurality of nodes, wherein each node is associated with a display element displayable in said display map, wherein each display element displays a plurality of selectively presentable attributes, wherein each attribute is alternately presented in one of a plurality of pre-selected visual formats, each visual format corresponding to a different discrete quantized value obtained by quantizing a range of continuous data based upon a user-supplied instruction, and wherein each node represents a component in a complex heterogeneous system;

receiving at least one data metric from said component;

converting said at least one data metric into an updated quantized value obtained by quantizing another range of continuous data based upon another user-supplied instruction; and providing said updated value to said display map, said display map updating at least one corresponding display element in the display map to reflect the updated value, wherein said obtaining, said receiving, said converting, and said providing steps are performed within a software agent, wherein said software agent is a platform-independent software object;

wherein said display map simultaneously displays said display elements in a planar fashion connected by visual lines illustrating communication links existing between each of the nodes represented by the display elements.

2. The method according to claim 1, wherein said updated value is used for computing an indicator for representing at least one attribute of said node, said method further comprising the step of:
displaying said computed indication on said display map within the display element.

3. The node exposing method of claim 1, wherein said display map includes a plurality of said nodes, and wherein particular ones of said nodes receive updated values provided by a plurality of different software agents.

4. The node exposing method of claim 1, wherein said display map includes a plurality of the display elements, said method further comprising the step of:
identifying at least one display map parameter relating to at least one of the attributes; and
setting each node so that each associated display element is adjusted to present attributes in accordance with the at least one display map parameter.

5. A node exposing method, comprising:
providing by request to a plurality of software agents, references to a plurality of nodes, wherein each node is associated with a display element displayable in a display map and represents a component in a content delivery network (CDN), and wherein each display element is capable of simultaneously displaying a plurality of attributes of an associated node, each attribute being alternately presented in one of a plurality of pre-selected colors, each color corresponding to a different discrete quantized value obtained by quantizing a range of continuous data based upon a user-supplied instruction;
each of said-agents, receiving at least one data metric from associated ones of said components;
each of said receiving agents, computing at least one updated node value responsive to receiving said at least one data metric; and
updating at least one of the display elements in the display map with said at least one updated node value received from said agents, wherein said display map simultaneously displays said display elements in a planar fashion connected by visual lines illustrating communication links existing between each of the nodes represented by the display elements.

6. The node exposing method of claim 5, wherein a plurality of different agents receive at least one data metric from one of said components.

7. The node exposing method of claim 5, wherein for particular ones of said agents said at least one data metric comprises a plurality of data metrics, and wherein said at least one updated node value comprises a plurality of updated node values, wherein said plurality of updated node values for said component are displayed within an associated one of the display elements.

8. A node exposing system, comprising:
a display map for displaying a plurality of display elements, each display element associated with a node, wherein each display element is visually presented in a pre-selected visual format that corresponds to a discrete quantized value obtained by quantizing a range of continuous data based upon a user-supplied instruction and representing at least one reported value for an attribute of the associated node, and wherein each display element is capable of simultaneously displaying a plurality of attributes of an associated node;
a plurality of components distributed across a heterogeneous network; and
a plurality of agents configured to acquire references to individual ones of said nodes, said agents obtaining updated values for particular nodes from data metrics obtained from associated ones of said components, said agents reporting said updated values to said nodes, said nodes responsively updating associated display elements, wherein said display map simultaneously displays said display elements in a planar fashion connected by visual lines illustrating communication links existing between each of the nodes represented by the display elements.

9. The system of claim 8, wherein a plurality of said agents receive data metrics from one of said components.

10. The system of claim 8, wherein a plurality of updated values associated with one of said components are displayed within one of said display elements presented within said display map.

11. A machine readable storage having stored thereon, a computer program having a plurality of code sections for exposing a node, said code sections executable by a machine for causing the machine to perform the steps of:
obtaining from a display map, references corresponding to a plurality of nodes, wherein each node is associated with a display element displayable in said display map, wherein each display element displays a plurality of selectively presentable attributes comprising metric data corresponding to an associated node, wherein each attribute is alternately presented in one of a plurality of pre-selected visual formats, each visual format corresponding to a different discrete quantized value obtained by quantizing a range of continuous data based upon a user-supplied instruction, and wherein each node represents a component in a complex heterogeneous system;
receiving at least one data metric from said component;
converting said at least one data metric into an updated quantized value obtained by quantizing another range of continuous data based upon another user-supplied instruction; and
providing said updated value to said display map, said display map updating at least one corresponding display element in the display map to reflect the updated value, wherein said obtaining, said receiving, said converting, and said providing steps are performed within a software agent, wherein said software agent is a platform-independent software object, and wherein said display map simultaneously displays said display elements in a planar fashion connected by visual lines illustrating communication links existing between each of the nodes represented by the display elements.

12. The machine readable storage according to claim 11, wherein said updated value is used for computing an indicator for representing at least one attribute of said node, said machine readable storage further comprising the step of:
displaying said computed indication on said display map within the display element.

13. The machine readable storage according to claim 11, wherein said display map includes a plurality of said nodes, and wherein particular ones of said nodes receive updated values provided by a plurality of different software agents.

14. A machine readable storage having stored thereon, a computer program having a plurality of code sections for exposing a node, said code sections executable by a machine for causing the machine to perform the steps of:

providing by request to a plurality of software agents, references to a plurality of nodes, wherein each node is associated with a display element displayable in a display map and represents a component in a content delivery network (CDN), and wherein each display element is capable of simultaneously displaying a plurality of attributes of an associated node, each attribute being alternately presented in one of a plurality of pre-selected colors, each color corresponding to a different discrete quantized value obtained by quantizing a range of continuous data based upon a user-supplied instruction;

each of said-agents, receiving at least one data metric from associated ones of said components;

each of said receiving agents, computing at least one updated node value responsive to receiving said at least one data metric; and updating at least one of the display elements in the display map with said at least one updated node value received from said agents, wherein said display map simultaneously displays said display elements in a planar fashion connected by visual lines illustrating communication links existing between each of the nodes represented by the display elements.

15. The machine readable storage according to claim 14, wherein a plurality of different agents receive at least one data metric from one of said components.

16. The machine readable storage according to claim 14, wherein for particular ones of said agents said at least one data metric comprises a plurality of data metrics, and wherein said at least one updated node value comprises a plurality of updated node values, wherein said plurality of updated node values for said component are displayed within an associated one of the display elements.

* * * * *